L. M. SABIN.
Electric-Motor.
No. 225,724. Patented Mar. 23, 1880.
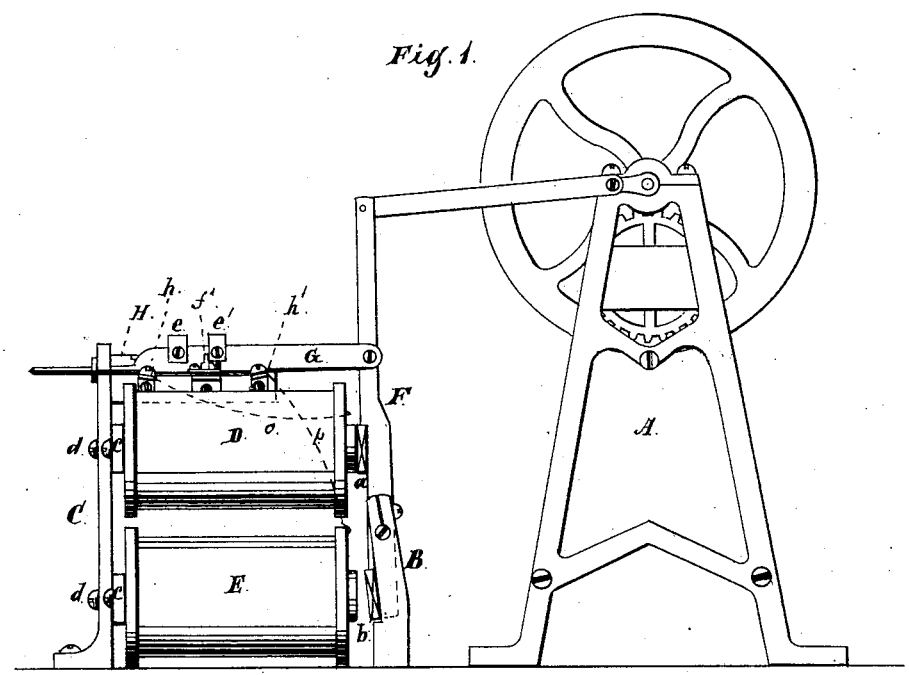
Witnesses:
O. W. Bond
H. F. Bruns
Inventor:
Luther M. Sabin

UNITED STATES PATENT OFFICE.

LUTHER M. SABIN, OF CHICAGO, ILLINOIS.

ELECTRIC MOTOR.

SPECIFICATION forming part of Letters Patent No. 225,724, dated March 23, 1880.

Application filed June 23, 1879.

*To all whom it may concern:*

Be it known that I, LUTHER M. SABIN, of Chicago, Cook county, and State of Illinois, have invented certain new and useful Improvements in Electric Motors, of which the following is a full description, reference being had to the accompanying drawings, in which—

Figure 1 is a side elevation; Fig. 2, a top or plan view, and Fig. 3 an end view.
The object of this invention is to improve the construction and increase the power of electric motors; and its nature consists in so applying the power or currents of electricity that when one magnet is attracting one side of the pivoted armature the other will repel it under the arrangement hereinafter described; in connecting the magnets with two batteries or a double line of wires; and in the combinations and arrangements of wires and switches with the magnets, as is hereinafter more fully set forth and claimed as new.

In the drawings, A indicates any suitable train of gearing to be driven by the motor; B C, the supporting-frame; D, the upper, and E the lower, magnets; F, the armature-bar, to which the pitman-rod or other device for connecting the motor with the gearing is connected; G, the switch-shifting bar; H, a projecting or cross bar upon which the switches and plates are supported; $a$, the upper, and $b$ the lower, armature-bars; $a'$ $a''$, the bar and pivots by and upon which the armature is supported; $c$, the magnet cross-bars; $d$, screws by which the magnets are held in place on the post C; $e$ $e'$, adjustable collars or brackets on the bar G, for operating the switches; $f$ $f'$, switches; $g$ $g'$, switch plates or bars for the switch $f$; $h$ $h'$, switch bars or plates for the switch $f'$; $i$ $i'$, binding posts or screws; $j$, wire leading from the first battery; $k$ $k'$, wires leading back to complete the circuit, or negative wires; $l$, leading or positive wire from the second battery; $m$ $m'$, return or negative wires; $n$ $n'$ $o$ $p$, magnet-wires.
The magnets are or may be of the ordinary construction, and the cores may be left to project beyond the coils or not, as desired. They are secured in position on the post or part of the supporting-frame C by the screws $d$, or in any other suitable manner. The bar H is attached to the upper end of the post C, and projects inward a sufficient distance to support the switches and switch plates or bars. The switch-plates and binding-posts are also of the ordinary construction.

The switches are made in the form shown, and are operated by the bar G, which is connected with the armature-bar F and reciprocated by it. The collars $e$ $e'$ are adjustable on the bar G, and are held by set-screws, so that they can be moved to give the switches more or less time on the switch-plates, which is accomplished by spreading them apart or moving them nearer together. By this arrangement of the collars on the bar G and extending the free ends of the switches between them, both switches are moved at the same time and by the same devices. The bar F is supported on the posts B by the bar $a'$, which turns freely upon the points of the screws $a''$. The armature-bars $a$ $b$ are permanently magnetized or polarized, and their poles are arranged to act in harmony with the magnets D and E in attracting and repelling. The movements of the bar F actuate the crank-pitman and the bar G.

In operation, when the wires are properly connected, a current passes the wire $l$ to the switch-plate $g''$, through the switch $f$ to the wire $n$, to and through the lower magnet to the wire $p$ and to the wire $m$, which is the negative wire of that half of the wires. While this operation takes place another current passes the wire $j$ to the plate $h''$ and switch $f'$, by the wire $o$ to the upper magnet, through this to the wire $n'$ and negative wire $k$. When the movement of the bar G shifts the switches toward the frame A, then the current from the wire $l$ goes to the switch $f$, switch-plate $g'$, and wire $n'$, to the upper magnet, and from that magnet, over the wires $o$ and $m'$, to the negative wire $m$. A current also passes at the same time from the wire $j$ to the switch $f'$, switch plate or bar $h'$, and wire $p$, to the lower magnet, and from that, over the wires $n$ and $k'$, to the negative wire $k$.

By this arrangement of the wires and double currents of electricity there are an attraction and a repulsion operating at the same time on the armature-arms $a$ $b$, and for this purpose it is not necessary that these arms should be polarized. The bars $a$ $b$ being attached to the bar F on opposite sides of the pivot-bar $a'$ and equidistant therefrom, gives the bar F an oscillating or rocking movement, which nearly doubles the power of the motor as compared with a motor of the same construction having only a single current operating thereon, and the power of the motor is still further increased by making the armature-bars $a\ b$ permanent magnets, or polarizing them. The polarity of these armature-bars remains the same at all times, while that of the temporary magnets or coils is reversed at each shifting of the switches, so that when the upper one attracts the lower one repels, and the lower one attracts when the upper one repels, thereby causing the magnets to act in opposite directions at each movement of the armature with their full force or power.

What I claim as new, and desire to secure by Letters Patent, is—

1. The combination of the separate battery-wires $j$ and $l$ with the magnets D and E, switches $f f'$, and pivoted armature for leading or conducting two separate currents of electricity to the motor, acting in opposite directions, whereby one end of the armature-lever is attracted by the upper magnet and its opposite end repelled by the lower magnet, and alternately reversed in operation, substantially as specified.

2. The pivoted bar F, having the polarized bars $a\ b$, with the magnets D E, switches $f f'$, and connected with the separate battery-wires $j\ l$, for operating with two separate and opposite currents of electricity, substantially as described.

3. The combination of the bar G, adjustable collars $e\ e'$, with the switches $f f'$, and bar F, substantially as set forth.

4. The combination and arrangement of the wires $l$, $n$, $n'$, $m$, $m'$, $j$, $k$, $k'$, $o$, and $p$ with the switches $f\ f'$, plates $g\ g'$ and $h\ h'$, with the magnets D and E, pivoted armature F $a\ b$, and shifting-bar G, substantially as and for the purpose specified.

LUTHER M. SABIN.

Witnesses:
O. W. BOND,
H. F. BRUNS.